Figure 6:
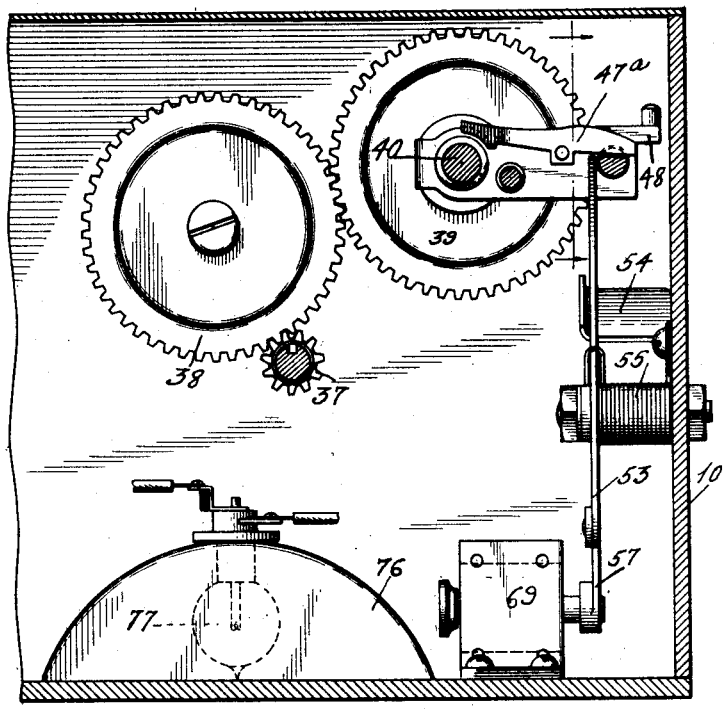

F. A. WIELAND.
REGISTER AND SIGNAL MECHANISM FOR VEHICLES.
APPLICATION FILED APR. 21, 1915.
1,190,694.
Patented July 11, 1916.
3 SHEETS—SHEET 1.
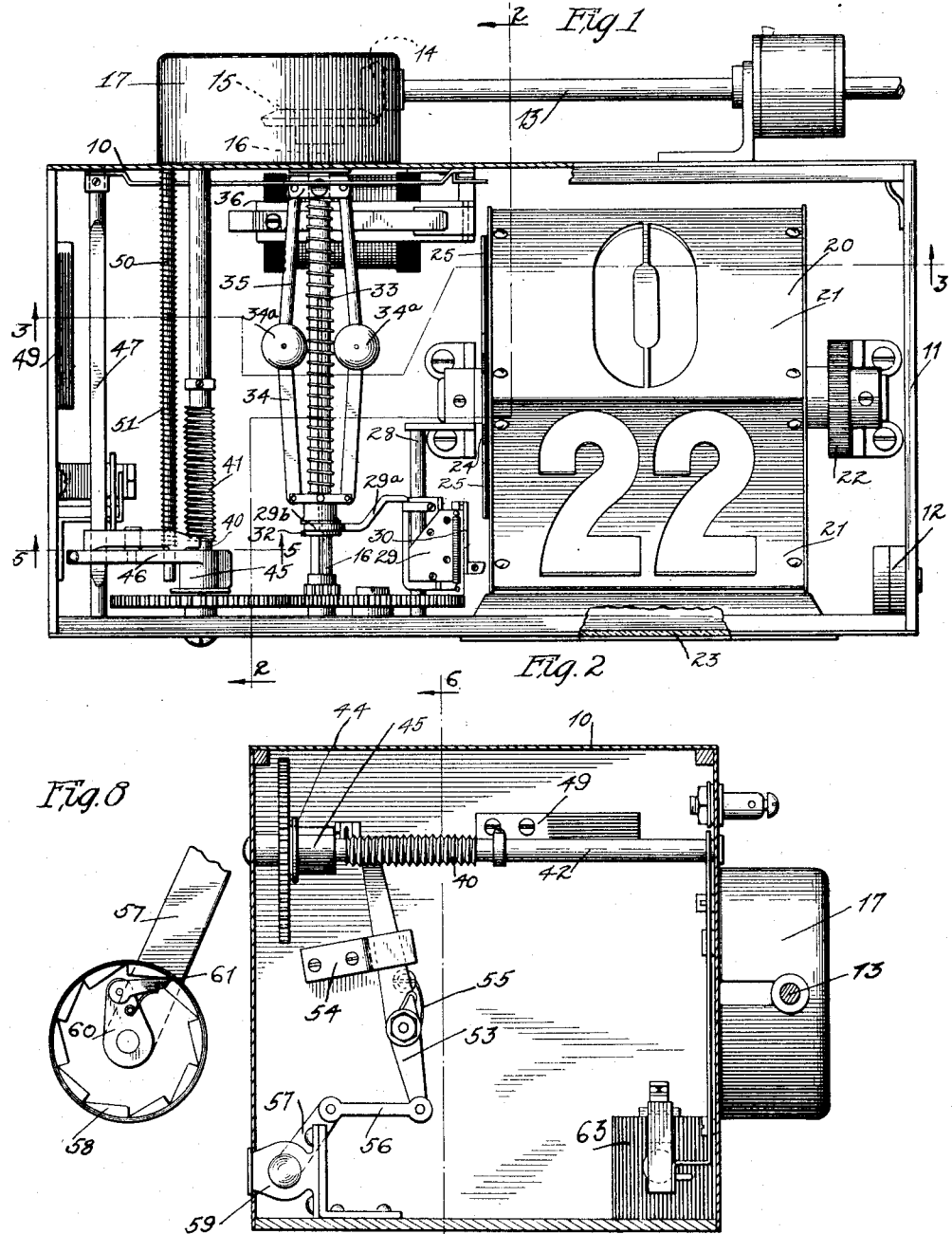

F. A. WIELAND.
REGISTER AND SIGNAL MECHANISM FOR VEHICLES.
APPLICATION FILED APR. 21, 1915.
1,190,694.
Patented July 11, 1916
3 SHEETS—SHEET 2.
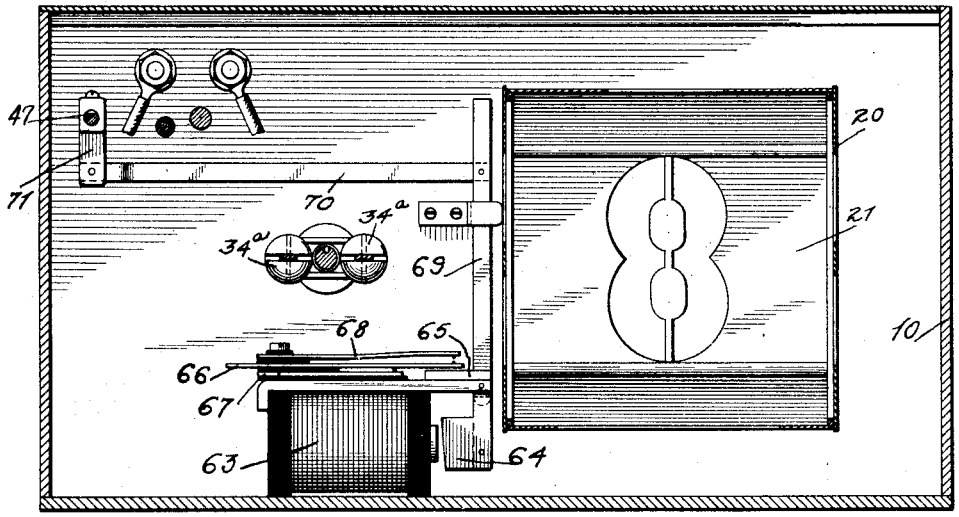
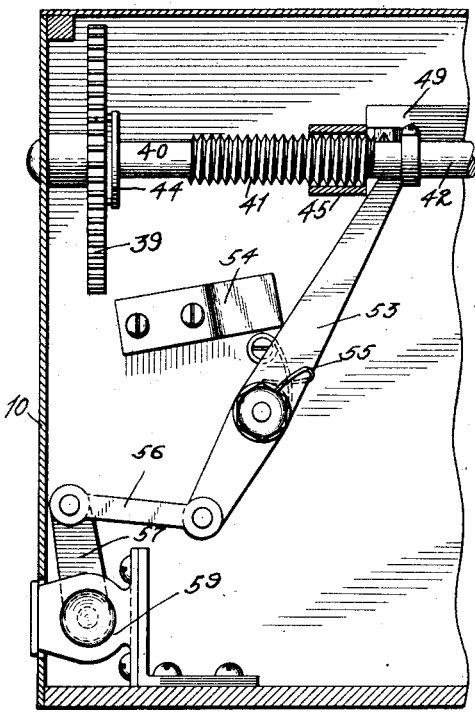
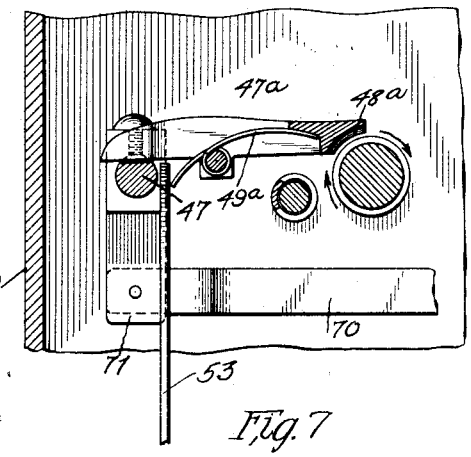
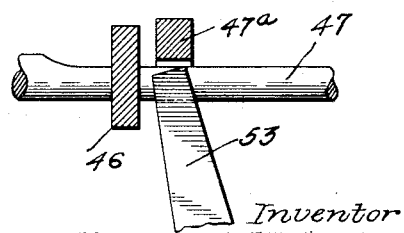
Witnesses:
Albin C. Ahlberg
H. G. Weiburger
Inventor
Frederick A. Wieland
By William V Bradbury
Attorney F. A. WIELAND.
REGISTER AND SIGNAL MECHANISM FOR VEHICLES.
APPLICATION FILED APR. 21, 1915.

1,190,694.

Patented July 11, 1916.
3 SHEETS—SHEET 3.

Witnesses:
Albin C. Ahlberg
H. A. Neiburger

Inventor
Frederick A. Wieland
By Williams & Bradbury
Attorney

UNITED STATES PATENT OFFICE.

FREDERICK A. WIELAND, OF CHICAGO, ILLINOIS.

REGISTER AND SIGNAL MECHANISM FOR VEHICLES.

1,190,694.  Specification of Letters Patent.  Patented July 11, 1916.

Application filed April 21, 1915. Serial No. 22,893.

*To all whom it may concern:*

Be it known that I, FREDERICK A. WIELAND, a citizen of the United States, residing at Chicago, in the county of Cook and State of Illinois, have invented a certain new and useful Improvement in Register and Signal Mechanism for Vehicles, (Case 1,) of which the following is a full, clear, concise, and exact description, reference being had to the accompanying drawings, forming a part of this specification.

My invention relates to register and signal mechanism for vehicles, particularly automobiles, and broadly the object of my invention is to provide means for discouraging overspeeding of the vehicle and for making a registration each time the vehicle exceeds a predetermined speed limit.

The register mechanism forming a part of my invention is preferably inclosed in a casing which may be mounted at any place upon the vehicle, desirably at the rear end thereof, and is connected with one of the moving parts of the vehicle, for instance one of the wheels thereof through a flexible shaft or its equivalent.

In the present specification I shall describe a preferred embodiment of my invention, and it will be seen that this embodiment of my invention comprises in addition to the register mechanism visual and audible signals which are energized when the vehicle exceeds a predetermined speed limit, to notify the driver and likewise persons in the vicinity of the vehicle that the vehicle is overspeeding.

The means for making a registration of the overspeeding of the vehicle comprises a suitable register and means for actuating said register when the vehicle with which the mechanism is associated exceeds a predetermined speed limit. Inasmuch as the register is primarily provided in order that the owner of the vehicle with which it is associated may know that inexcusable speeding of the vehicle has taken place, means is provided whereby, even though overspeeding of the vehicle does take place, the register mechanism is not advanced until the overspeeding continues for a predetermined distance, say, for instance, five hundred feet. This leeway permits the driver of the vehicle to speed up his machine for short distances in order to get out of jams in the street and get across railroad tracks, etc., without having the register show that he has overspeeded the machine. It is, of course, necessary for drivers of automobiles to speed up at times in order to avoid accident, and the present invention takes care of this necessity.

The present embodiment of my invention is so arranged that the owner of the vehicle may adjust the mechanism so that the register and signals will be actuated when the vehicle exceeds any one of a plurality of speeds. The register mechanism and the signaling devices, or some of them, are desirably contained within a casing which may be locked to prevent unauthorized tampering with the mechanism by the driver of the vehicle.

The means whereby I attain the objects of my invention and the operation thereof is fully set forth in the following detail description, in which reference is made to the accompanying drawings, in which—

Figure 9:
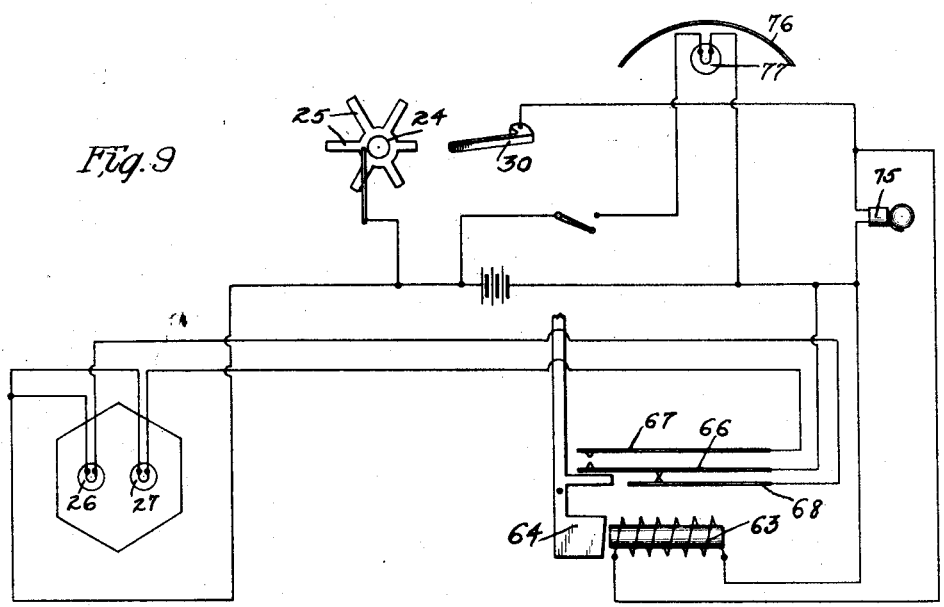

Figure 1 is a plan view of the signaling and register casing with the cover removed, certain parts being illustrated in section to more clearly reveal the construction; Fig. 2 is a detail sectional view taken on the broken line 2, 2 of Fig. 1 and looking in the direction indicated by the arrows, certain parts being omitted in this figure for the sake of clearness; Fig. 3 is a vertical sectional view taken on the line 3, 3 of Fig. 1 and looking in the direction indicated by the arrows; Fig. 4 is a fragmentary detail view, partly in section and partly in elevation, illustrating the register and its associated actuating mechanism; Fig. 5 is a fragmentary detail sectional view of the devices for controlling the actuation of the register, this view being taken on the line 5, 5 of Fig. 1 and looking in the direction indicated by the arrows; Fig. 6 is a fragmentary detail view, partly in section and partly in elevation, taken on the line 6, 6 of Fig. 2 and looking in the direction indicated by the arrows; Fig. 7 is an isolated detail sectional view of the devices for actuating the register; Fig. 8 is an enlarged fragmentary detail view of the mechanism for imparting movement to the register; and Fig. 9 diagrammatically illustrates the several electrical connections which may be employed when the embodiment of my invention hereinafter described is made use of.

Similar characters of reference refer to similar parts throughout the several views.

Referring now to Fig. 1 of the drawings, I have illustrated at 10 a register and signal casing which is preferably box-like in construction and is provided with a removable end closure 11 provided with a lock 12 of any suitable construction. The casing 10 is conveniently mounted upon the rear end of the associated automobile or other vehicle, and the operating parts within the casing 10 are connected by a flexible shaft or its equivalent with one of the wheels of the automobile in substantially the same manner as are the corresponding parts illustrated in my Patent No. 1,137,822, issued May 4, 1915. The flexible driving connection is connected in any suitable manner with a shaft 13 disposed behind the casing 10 and mounted in bearings supported by the casing. The shaft 13 is provided with a bevel gear 14 coöperating with a bevel gear 15 mounted upon a shaft 16 extending transversely through the casing 10 and having suitable bearings in the lateral walls of the casing. A housing 17 for the gears 14 and 15 is desirably provided as is illustrated in Fig. 1.

Disposed within the casing 10 and mounted in suitable bearings 18 and 19 is a sign drum 20 preferably substantially hexagonal in cross-section and provided with a plurality of sign plates 21, 21 having numbers placed thereon to indicate the several speeds for which the mechanism may be adjusted. The angular position of the drum 20 is adjusted by turning a milled handle 22, and suitable means not illustrated is provided for retaining the drum 20 at any desired position. The casing 10 is provided with a window or sight opening 23, through which the sign plate corresponding to the selected speed is visible. Carried on the left-hand end of the drum 20 and insulated therefrom is the ring 24 provided with a plurality of radial arms 25 of unequal lengths, each arm corresponding to one of the sign plates 20. The details of this mechanism are not illustrated in the present application inasmuch as these features are illustrated in my patent above referred to. The ring 24 is illustrated in more detail in the diagrammatic representation of the circuit shown in Fig. 9. For the purposes of the present application it will suffice to say that the longest one of the arms 25 corresponds to the sign plate of smallest number and that the shortest arm 25 corresponds to the sign plate of highest number, and that the remaining arms correspond to the plates of intervening numbers. Disposed within the drum 20 are suitable electric lamps illustrated at 26 and 27 in Fig. 9, these lamps being preferably of different colors, as for instance, red and blue, respectively. The means for mounting the electric lamps within the drum is illustrated in my patent above referred to, and it is therefore unessential that the mounting of the lamps be illustrated in detail in the present application.

Supported by the bracket 18 and one of the walls of the casing 10 is a bar 28, which serves as a track for a carriage 29 carrying yielding contact element 30. Spring means is associated with the contact arm 30 to permit the same to yield slightly when the arm 31 thereof comes into engagement with one of the arms 25 of the ring 24 carried by the drum 20. Fixed with respect to the carriage 29 is an arm 29ᵃ provided with a forked end 29ᵇ embracing a collar 32 movable longitudinally of the shaft 16, but keyed against rotation independently thereof. A spring 33 disposed around the shaft 16 normally tends to hold the collar 32 in the position illustrated in the drawings. The collar 32 is connected by links 34 with governor balls 34ᵃ, connected in turn by arms 35 pivoted to a head 36 fixed upon the shaft 16. It will be seen that when the shaft 16 is rotated, the governor balls 34ᵃ, flying outwardly, will move the sleeve 32 against the action of its associated spring 33 an amount proportional to the speed of the vehicle with which the mechanism is associated.

The several parts of my improved mechanism thus far described are not materially different from the mechanism illustrated in my patent previously referred to, and therefore I believe that the foregoing description of the same will suffice for the purposes of this application. It will be sufficient to say that when the contact device 30 comes into contact with one of the arms 25 carried by the drum 20, electrical circuit connections are established which serve in part to accomplish the objects of my present invention. The circuit arrangement and operation of the several parts will more fully hereinafter appear.

As is most clearly illustrated in Figs. 1 and 6, the shaft 16 is provided with a pinion 37 meshing with a gear 38 supported by the casing 10, and the gear 38 in turn meshes with a gear 39 fixed relatively to a shaft 40 provided with screw threads 41, as is most clearly illustrated in Fig. 4. The shaft 40 at its left end (Fig. 4) is supported by the casing 10, and the right end of said shaft 40 bears in the adjacent end of a rod 42, the other end of which is fixed to the casing 10. Disposed upon the shaft 40 and normally bearing against a disk 44 carried by the spur gear 39 is a sleeve 45 having an arm 46 formed integral therewith, the end of the arm 46 opposite the sleeve 45 conformed to fit over an oscillatory bar or rod 47 extending transversely of the casing 10. As is clearly illustrated in the drawings, the oscillatory bar 47 is flattened on one side, but the aperture in the arm 46 through which the rod 47 extends is so shaped that the rod 47 may turn independently of the arm 46. The sleeve 45 is adapted to travel longitudinally of the shaft 40 from left to right (Figs. 2 and 4) until a projection 48 carried by the arm 46 abuts against a strip 49 carried by the adjacent end of the casing 10. A rod 50, supported at one end by the casing 10, extends freely through an aperture in the arm 46, as is clearly illustrated in Fig. 6, and disposed around the rod 50 is a helical spring 51 which normally tends to retain the sleeve 45 and its arm 46 in the positions illustrated in Figs. 1 and 2 of the drawings.

Pivoted to the arm 46 of the sleeve 45 is a lever 47$^a$, the inner end of which is threaded on its under surface, as is most clearly illustrated at 48$^a$ in Fig. 5. A coiled spring 49$^a$ normally tends to hold the threaded end 48$^a$ of the lever 47$^a$ out of engagement with its adjacent screw-threaded shaft 40 and the other end of said lever in engagement with the flattened side of the oscillatory rod 47 previously referred to. It will be seen by referring to Fig. 5 that if the oscillatory rod 47 be turned through an angle of a few degrees, the lever 47$^a$ will be operated to bring the threaded end 48$^a$ thereof into engagement with the threads of the shaft 40, and that, therefore, the lever 47$^a$ and parts connected thereto will, if the shaft 40 be rotating in the direction indicated by the arrows in Fig. 5, travel longitudinally of said shaft. The shaft 40, due to its geared connection with the shaft 16, rotates whenever the vehicle with which the improved mechanism of my invention is associated is in motion.

Pivoted to one end of the casing 10 is a lever 53, the long arm of which is normally held in engagement with a stop 54 by an associated spring 55, as is clearly illustrated in Fig. 2. The free end of the long arm of the lever 53 extends upwardly into the path of the arm 46 of the sleeve 45 so that the lever 53 will be operated when the arm 46 travels from left to right (Fig. 2) across the shaft 40. The shorter arm of the pivoted lever 53 is connected by a link 56 with an arm 57 adapted to operate a register 59 of any suitable construction. The register is preferably disposed within the casing 10, as is illustrated in Fig. 2 of the drawings, and its indications are ascertainable through an aperture in the casing.

In Fig. 8 I have illustrated somewhat diagrammatically the connection between the operating arm 57 and the units order set of the indicating register. Fixed with respect to the units order set of the register is an internal ratchet gear 58, and fixed with respect to the operating arm 57 is an arm 60 having pivoted thereto a pawl 61 held in engagement with the internal teeth of the ratchet 58 by a spring 62. It will be seen that before operation of the lever 53 will affect the register 59, the lever 53 must be moved to the position illustrated in Fig. 4 in order to permit the pawl 61 to snap over one tooth of the internal ratchet gear 58. When the lever 53 is moved to the position illustrated in Fig. 4 and released, its associated spring 55 returns it to normal position against its associated stop 54, and owing to the fact that the pawl 61 is snapped over one tooth of the internal ratchet gear, the register is advanced one step. Any operation of the lever 53 insufficient to carry the pawl 61 past one tooth of the internal ratchet gear will not result in actuation of the register 59.

Mounted within the casing 10 is an electromagnet 63 most clearly illustrated in Fig. 4, and this electromagnet is provided with a pivoted armature 64 carrying an arm 65 adapted when the armature is attracted to move a switch contact 66 out of engagement with a contact 67 and into engagement with a contact 68. The circuit arrangement will be hereinafter described in detail, but it will suffice to say at this point that when the vehicle with which my mechanism is associated exceeds a predetermined speed, the armature 64 is attracted, thereby operating the switch contacts to cause operation of the electrically operated visible and audible signals. The armature 64 is also provided with an elongated arm 69, having pivoted to its upper end a link 70 connected to a crank arm 71 fixed upon the rod 47. It will be seen, therefore, that when the electromagnet 63 is actuated, due to overspeeding of the associated vehicle, the shaft 47 is oscillated through an angle of a few degrees due to the connection between said shaft and the armature 64. When the shaft 47 is thus oscillated, the shorter arm of the pivoted lever 47$^a$ is elevated, bringing the threaded end 48$^a$ thereof into engagement with the shaft 40, which shaft, as has previously been explained, is so connected as to rotate at a speed proportional to the speed of the vehicle. When the threaded end 48$^a$ of the lever 47$^a$ is brought into mesh with the threads 41 of the sleeve 40, the arm 46 of the sleeve 45 is carried from left to right (Figs. 2 and 4) and the arm 46 abutting against the longer arm of the lever 53 carries the same with it against the action of the spring 55 associated with the lever 53. The several gear ratios are such that the vehicle must travel approximately five hundred feet before the lever 53 is carried to the position indicated in Fig. 4. When the sleeve 45, arm 46 and associated parts reach the positions indicated in Fig. 4, the projection 48 carried by the arm 46 abuts against its stop 49, and the several parts remain in this position until the electromagnet 63 is deënergized, whereupon the arm 47$^a$ assumes its normal position and the spring 51 carries the arm 46 and parts fixed relatively thereto to the positions illustrated in Figs. 1 and 2 of the drawings. The arm 53 is at this time returned to its initial position by its associated spring 55 and as it is returned to initial position imparts movement to the register 59.

Referring to the diagrammatic representation of the circuit in Fig. 9, it will be seen that current is normally supplied to the lamp 26 within the drum 20 to keep the same lighted. When the machine exceeds the predetermined speed limit for which the mechanism is set, the contact device 30 carried by the head 29 engages one of the arms 25 of the ring 24 carried by the drum 20, and the electromagnet 63 is energized through a circuit that may be readily traced. At the same time an electric bell 75 is actuated. This bell 75 has not been illustrated in the other figures of the drawings, but it may be here stated that this bell may be located either within the casing 10 or elsewhere at any convenient point. It is desirable to have the bell so located that the driver of the associated vehicle cannot tamper with the circuit therefor. Energization of the electromagnet 63 actuates its armature 64, and in addition to starting the operation of the register operating devices, as has heretofore been explained, moves the switch contact 66 from engagement with the contact 67 and into engagement with the contact 68, thereby deënergizing the circuit of the lamp 26, and energizing the circuit of the lamp 27, changing the color of the number exhibited through the window in the casing 10 and affording a visual signal that the vehicle is overspeeding. I have illustrated at 76 in Figs. 6 and 9 a downwardly directed reflector provided with a lamp 77. Inasmuch as the casing 10 is disposed at the rear end of an associated vehicle, it may be conveniently disposed over the license number plate of the vehicle so that the lamp 77 will throw its rays downwardly upon the license number plate. The lamp 77 is connected in circuit as illustrated in Fig. 9.

From the foregoing description it will be seen that I have provided means whereby a register is actuated whenever the vehicle with which my improved mechanism is associated exceeds a predetermined speed limit for a predetermined distance in addition to affording visual and audible signals when the vehicle overspeeds.

The hereindescribed embodiment of my invention differs essentially from the apparatus described and claimed in my Patent No. 1,137,822, issued May 4, 1915, in that the register is operated when the vehicle exceeds a predetermined speed for a predetermined distance.

What I claim as new and desire to secure by Letters Patent of the United States is:

1. Mechanism of the class described comprising, in combination, a register, actuating devices for said register, means for driving said actuating devices from a movable element of an associated vehicle, said actuating devices adapted when placed in driving relation to the register to effect the operation of the latter after the vehicle has traveled a predetermined distance, and means for placing said actuating devices in driving relation to the register when the associated vehicle exceeds a predetermined speed.

2. Mechanism of the class described comprising, in combination, a register, actuating devices for said register, means for driving said actuating devices from a movable element of an associated vehicle, said actuating devices adapted when placed in driving relation to the register to effect the operation of the latter after the vehicle has traveled a predetermined distance, and electromagnetically controlled devices for placing said actuating devices in driving relation to the register when the associated vehicle exceeds a predetermined speed.

3. Mechanism of the class described comprising, in combination, a register, actuating devices for said register arranged to be driven from a movable element of an associated vehicle and adapted, when placed in driving relation to the register, to effect the operation thereof when the vehicle travels a predetermined distance after said relation is established, and means operable by the associated vehicle adapted to place said actuating devices in driving relation to the register when the vehicle exceeds a predetermined speed.

4. Mechanism of the class described comprising, in combination, a register, actuating devices for said register arranged to be driven from a movable element of an associated vehicle and adapted, when placed in driving relation to the register, to effect the operation thereof when the vehicle travels a predetermined distance after said relation is established, and electromagnetic mechanism controlled from a movable element of the associated vehicle adapted to place said actuating devices in driving relation to the register when the vehicle exceeds a predetermined speed.

5. The combination with a vehicle, of a register, and means controlled by a movable element of the vehicle for actuating said register when the vehicle exceeds a predetermined speed for a predetermined distance.

6. The combination with a vehicle, of a register, actuating devices for the register driven from a movable element of the vehicle adapted when placed in driving relation to the register to effect operation of the latter after a predetermined amount of movement has been inparted to the actuating devices, and means for establishing said driving relation when the vehicle exceeds a pre-determined speed.

7. Mechanism of the class described comprising in combination a register, a screw threaded shaft driven from a movable part of an associated vehicle, means for operating said register provided with a threaded portion adapted to coöperate with said screw threaded shaft but normally out of engagement therewith, said register operating means adapted to actuate the register when the said register operating means has been moved to a pre-determined position along said screw threaded shaft and released, together with means operated from the associated vehicle arranged to effect the engagement of the register operating means with the screw threaded shaft when the vehicle exceeds a pre-determined speed and to permit the release of the register operating means from the screw threaded shaft when the rate of travel of the vehicle again falls below said pre-determined speed.

8. Mechanism of the class described comprising in combination a register, operating means therefor adapted to effect the operation of the register when said operating mechanism has been moved to a certain position and released, together with means operated from a movable portion of an associated vehicle arranged to move said register operating mechanism toward the aforesaid position whenever the vehicle exceeds a pre-determined speed whereby said register is operated when, and only when, the vehicle has exceeded such pre-determined speed for a substantial distance.

In witness whereof, I hereunto subscribe my name this 9th day of April, A. D. 1915.

FREDERICK A. WIELAND.

Witnesses:
A. G. McCaleb,
H. A. Neiburger.

Copies of this patent may be obtained for five cents each, by addressing the "Commissioner of Patents, Washington, D. C."